July 5, 1927.
C. W. ANDERSON
DRAIN TRAP
Filed April 8, 1926
1,634,530
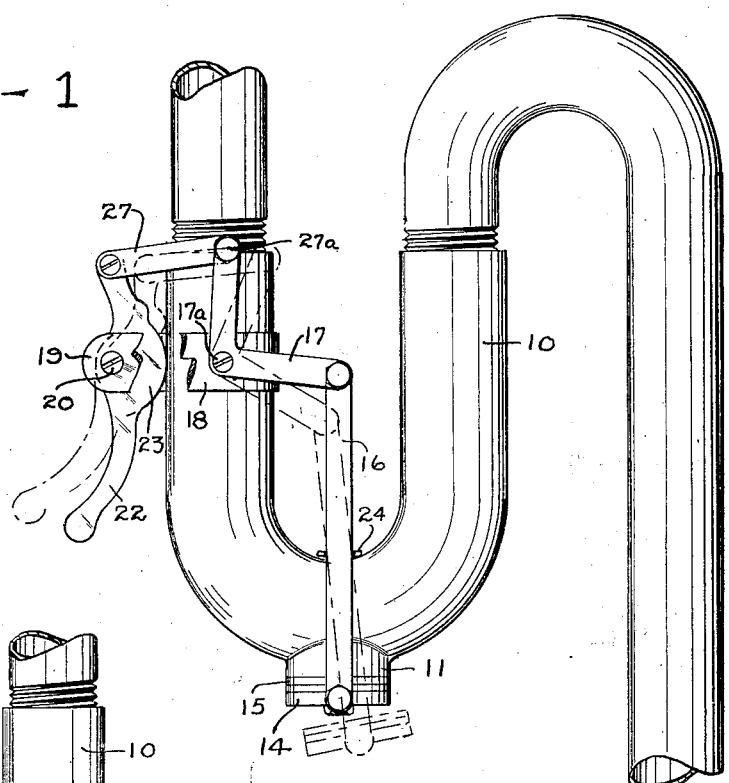
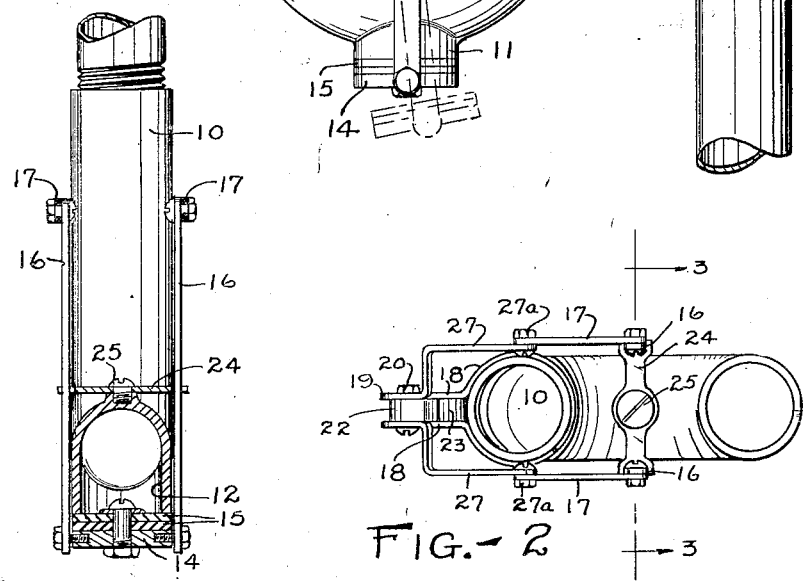
Inventor
Charles W. Anderson
By Bates, Macklin, Golrick & Teare
Attorneys Patented July 5, 1927.

1,634,530

UNITED STATES PATENT OFFICE.

CHARLES WM. ANDERSON, OF MILAN, OHIO.

DRAIN TRAP.

Application filed April 8, 1926. Serial No. 100,527.

This invention relates to plumbing fixtures and more particularly to drain traps for sinks and the general object thereof is to provide an attachment adaptable to standard trap fittings which will permit of a convenient and sanitary manner for draining foul, extraneous matter from the trap.

A further object of my invention is to provide a device including a trap plug, which device may be attached to a goose neck trap fitting in such manner that the plug may be shifted from the trap opening without experiencing the usual annoyance of contact with foul matter escaping from the trap.

Other objects of my invention will hereinafter become apparent from the following description which refers to the accompanying drawings illustrating a preferred embodiment thereof. The essential characteristics are summarized in the claims.

In the drawings, Fig. 1 is a side elevational view of a goose neck trap fitting equipped with my novel plug holding attachment; Fig. 2 is a plan view of the fitting of the device shown in Fig. 1; and Fig. 3 is a cross-sectional view taken substantially along line 3—3 of Fig. 2.

My invention contemplates the provision of a device having a plug which may be readily attached to a standard goose neck trap fitting to thereby replace the usual threaded plug. The character of this device is such that the plug may be dropped away a substantial distance from the goose neck fitting to permit the trap to be emptied of undesirable matter and which may be operable to place the plug in water-tight connection over the trap opening. In Fig. 1 of the drawings I show a goose neck trap 10 of the usual standard design having a lower short apertured branch 11 provided with an opening 12 for emptying the trap when desired. I seal this opening with a plug 14 of a convenient form to carry a resilient gasket or washer 15.

In order that the plug may be dropped away from the fitting 10 without necessitating the soiling of the hands of the manipulator, I pivotally suspend the plug upon a pair of vertically extending members 16 which are attached at the upper ends thereof to lever members in the form of bell cranks 17 which may be pivotally mounted upon an attachable collar 18, as shown at 17ª of a convenient form to permit ready attachment of the device to one leg of the standard fitting 10. The collar 18 may be provided with perforated ears 19 to receive a pin or screw 20 and these ears are formed to be spaced apart a sufficient distance to permit the mounting of a cam lever 22 therebetween.

The upper end of the lever 22 is formed to afford attachment for two link members 27 which are pivotally attached to the front legs of the bell crank levers 17 as shown at 27ª and this lever member is also provided with a cam or locking portion 23 which may engage the wall of the fitting leg to which the collar 18 is attached. When the lever is in the position shown in Fig. 1, the cam portion is wedged against the fitting, thus securing the members 16 and bell crank lever 17 in the position shown and in this upward position, the plug 14 is urged upwardly with sufficient force to cause compression of the gasket 15 on the branch 11 of the fitting, thus sealing the opening 12 of the fitting.

If desired, a guide means may be provided for spacing and guiding the members 16 and such means may comprise a flat member 24 secured to the fitting in any suitable manner such as a screw 25 at a point in alignment with the branch portion 11 of the fitting.

To drain the trap the cam lever is shifted to the position shown in dotted lines in Fig. 1, thus causing the plug to be lowered away from the fitting and to close the fitting the cam lever is shifted to the full line position. In this latter position the pivotal connection between the respective members comprising the attachment are shifted past normal dead center positions thus causing the plug to be locked in sealed relation to the fitting opening.

From the foregoing description of my invention, it will be seen that I provide a simple device for suspending a drain trap plug when it is desired to open the trap and for maintaining the plug in sealed relation to the trap when the trap is in use and that this device is of such form as to be economically manufactured and readily attached to a trap of standard dimensions. Furthermore, it will be noted that the operating means for the plug is disposed above the trap opening whereby the plug may be dropped away from the fitting without any resulting discomfiture to the manipulator of the device.

I claim:

1. In a device of the character described, the combination of a drain fitting, there being a drain opening formed in the lower part of the fitting, a plug for sealing the opening, said plug having a resilient member mounted thereon to engage the fitting around said opening, a pair of upright members attached to the plug for pivotally suspending the plug, laterally extending guiding means for keeping said upright members in alignment with the opening of the fitting when the plug is dropped therefrom and lever members including a cam lever for locking said upright members in such position as to cause said plug to seal the opening.

2. In a device of the character described, the combination of a drain fitting having a U-shaped portion, there being a drain opening formed in the lower part of the U-shaped portion, a plug for sealing the opening, a pair of members attached to the plug for suspending the plug, a guide member for keeping said members in alignment when away from the opening, a member clamped to one leg of the fitting at a point above the drain opening, a pair of bell cranks pivotally mounted on said last named member and operated by a cam lever for raising said first named members to bring the gasket on the plug into compressed relation to the fitting about the opening.

3. In a U-shaped drain trap having a drain opening at the lower part of the U, the combination of a plug for sealing said opening and a pair of arms extending upwardly and adapted to carry said plug, a member secured to the U opposite the opening for guiding said arms, a band shaped member engaging one leg of the U above the opening, a pair of bell cranks pivotally mounted on said last named member engaging the upper ends of said arms to suspend the arms in a substantially vertical position, a self locking handle carried by said band member, and link members joining the handle to the bell cranks, whereby the drain may be opened and locked in closed position from a distant point.

4. In a U-shaped drain trap having a drain opening at the lower part of its U-shape, the combination of a plug for sealing said opening and a self locking means attached to the fitting and extending upwardly from the bend of the U for holding the plug in sealed relation to the drain opening of the fitting, said self locking means being attachably secured to one leg of the trap by a contractable band member embracing said U leg.

In testimony whereof, I hereunto affix my signature.

CHARLES WM. ANDERSON.